United States Patent [19]

Harvey et al.

[11] 4,279,658
[45] Jul. 21, 1981

[54] CHEMICAL-MECHANICAL STARCH CONVERSION

[75] Inventors: Richard D. Harvey; Thomas L. Gallaher; Raymond L. Mullikin; Thomas L. Small, all of Muscatine, Iowa

[73] Assignee: Grain Processing Corporation, Muscatine, Iowa

[21] Appl. No.: 934,077

[22] Filed: Aug. 16, 1978

[51] Int. Cl.$^3$ ............................................. C08L 3/00
[52] U.S. Cl. ..................................... 106/213; 127/32; 127/71
[58] Field of Search ................ 106/213; 127/32, 71

[56] References Cited

U.S. PATENT DOCUMENTS

| | | | |
|---|---|---|---|
| 1,020,655 | 5/1912 | Perkins et al. | 106/213 |
| 1,020,656 | 5/1912 | Perkins et al. | 106/213 |
| 1,078,691 | 11/1913 | Perkins | 106/213 |
| 1,078,692 | 11/1913 | Perkins | 106/213 |
| 1,200,488 | 10/1916 | Grosvenor | 106/213 |
| 1,251,275 | 12/1917 | Perkins | 106/213 |
| 1,474,129 | 11/1923 | Weiss | 127/33 |
| 1,661,201 | 3/1928 | Stern | 127/32 |
| 1,790,346 | 1/1931 | Harvey | 106/213 |
| 2,373,016 | 4/1945 | Daly et al. | 127/70 |
| 2,376,885 | 5/1945 | Sherwood | 252/181 |
| 3,133,836 | 5/1964 | Winfrey et al. | 127/71 |
| 3,137,592 | 6/1964 | Prutzman et al. | 127/32 |
| 3,236,687 | 2/1966 | Smith et al. | 127/38 |
| 3,399,081 | 8/1968 | Bernetti | 127/71 |
| 3,630,774 | 12/1971 | Knight | 127/70 |

OTHER PUBLICATIONS

*Die Starke* vol. 15, No. 4, 1963, p. 157 and *Adhesive Age* vol. 5 No. 9, 1962.
*Die Starke* vol. 22 Oct. 10, 1970 p. 367 and DD-A-66,777.
Patentschrift 66777, Martin Zeh, Feb. 22, 1968.
Adhesive Age, Sep. 62, "Gelatinization of Starch in Caustic Alkali" 1962 Leach.
Corn Starch, Corn Industrie Res. Foundation 1964 pp. 28–31.
Patent Spec., S.N. 785,216, Kantorowics Apr. 1904.
Patent Spec. 376,445, Marsden et al. Jan. 20, 1887.
W. E. Raybould "*The Preparation of Starch Flocculant: Caustic Starch*" Apr. 1941.
A. W. Bauer et al. "*Alkali and Acid Processes of Starch Fractionation*" Textile Research Journal pp. 860–877, Sep. 1953.
G. B. Jambuserwala "*Action of Alkalis on Starches*" The Journal of The Textile Institute, pp. 1201–1208, Oct. 1941.
R. R. Myers et al. "*Inherent Viscosity of Alkaline Starch Solutions*" Methods in Carbohydrate Chemistry, vol. IV, Academic Press, 1964 pp. 124–127.
Rankin et al., "*Determination of Dialdehyde Units in Periodate-Oxidized Starches*," Analytical Chem. vol. 28, No. 6, Jun. 1956, pp. 1012–1014.
E. F. Dux "*The Cold-Water Soluble Starches*" Die Starke (Nr. 5/1954) pp. 90–94.
H. W. Leach, "*Adsorption von Alkalien das durch Starken*" Die Starke (Nr. 6/1961) pp. 200–203.
E. C. Maywald et al., "*Expansion and Contraction of Starch Molecules in Solution-Effects of Temp. pH and Alkali*".

Primary Examiner—Allan Lieberman
Attorney, Agent, or Firm—Neuman, Williams, Anderson & Olson

[57] ABSTRACT

Gelatinization and dispersion of starch with a starch solvent such as sodium hydroxide and using mechanical shear.

4 Claims, 3 Drawing Figures

CHEMICAL-MECHANICAL STARCH CONVERSION

This invention relates to a process for gelatinization of starch wherein starch is treated with a starch solvent and subjected to shearing forces. The process provides a means to continuously gelatinize and disperse starch essentially instantaneously with the incorporation of little or no thermal energy to yield a dispersed, essentially homogeneous product having desirable properties with respect to clarity, color, viscosity, stability, film formation and tack.

Native starch obtained from cereal grains or tuberous plants exists in the form of small granules. The granules are composed of molecules which are aligned in uniform manner and are tightly held together by strong associative bonds. This is often depicted as follows:

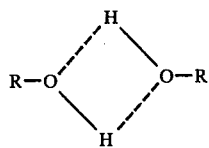

where R represents the ring structure of the anhydroglucose unit.

Starch in the granular state has little or no functional value as an adhesive or a film formation agent and therefore it is necessary to gelatinize or disperse the starch molecules by incorporating water into the associative bonds which can be illustrated as follows:

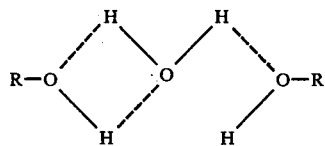

This is often referred to as hydration. However, starch granules are relatively insensitive to water and energy is required to effect hydration.

Most commercial hydration processes to date have employed primarily thermal energy and more recently combinations of thermal and mechanical energy. See, for example, U.S. Pat. No. 3,133,836.

An object of this invention is to provide a means of gelatinizing and dispersing starch wherein no external heat is required.

Another object of this invention is to provide a starch gelatinization and dispersion process which is continuous and essentially instantaneous in nature.

A further object of this invention is to provide a starch product which had unusual and stable storage properties at room temperature.

Further objects of this invention include preparing starch products having desirable physical characteristics such as tack or adhesive quality, filming properties and freeze-thaw properties.

In brief, the method of this invention involves preparing an aqueous slurry of starch and adding thereto a starch solvent. The starch slurry and starch solvent are subjected to mechanical shearing whereby the two are intimately mixed and a resultant highly dispersed, essentially homogeneous starch paste is produced. The process is conducted in a continuous manner such that a stream of the aqueous starch slurry and a stream of the starch solvent are brought together and subjected to mechanical shearing force to produce substantially instantaneously a starch paste which is well dispersed and essentially homogeneous.

The desired starch paste product is obtained substantially instantaneously. By this is meant that the desired starch paste is produced or available within five minutes and generally within a matter of seconds after application of mechanical shear to the starch slurry-starch solvent mixture. This is in contrast to prior art starch gelatinization processes wherein much longer periods are required to produce such starch pastes. In addition, most starch pastes produced by prior art procedures require constant agitation and/or recirculation to maintain the paste in a suitable, stable, usable condition.

There are two aspects of viscosity stability as used herein, i.e., shear stability and storage stability. A *shear stable* paste is one in which additional shear, from a type of device described herein, will not further reduce substantially the paste's viscosity. This can be expressed as follows:

$$\frac{\Delta V}{\Delta S} \text{ is approximately 0 (where } V = \text{viscosity and } S = \text{rate of shear)}$$

A *storage stable* paste is one wherein the viscosity does not change significantly over extended time periods at room temperature, i.e., not more than ±35% in about 24 hours.

It should be appreciated that a starch paste possessing shear stability may not necessarily be storage stable or vice versa. Moreover, neither absolute shear stability nor storage stability are always required for good functionality of the starch paste in use. Thus, a paste produced according to this invention need not possess storage stability if it is to be used soon after preparation, as is usually the case involving the use of starch pastes as adhesives in paperboard manufacture. On the other hand, in applications such as mining operations where extended storage of the paste may be required, large changes in viscosity during storage may be detrimental to its performance.

By use of sufficient shearing force and proper amount of starch solvent, pastes possessing storage stability can be readily produced by the process of this invention. Similarly, starch pastes having satisfactory functionality for various commercial applications are obtained even though the pastes are not absolutely shear stable as defined herein. It has been found that pastes having acceptable functionality and being suitably gelatinized and dispersed are obtained when the viscosity of the paste is not more than about 2 times its viscosity at the point of shear stability.

The method of this invention is more fully described in connection with the accompanying drawings and detailed descriptions. In the drawings.

Figure 1:
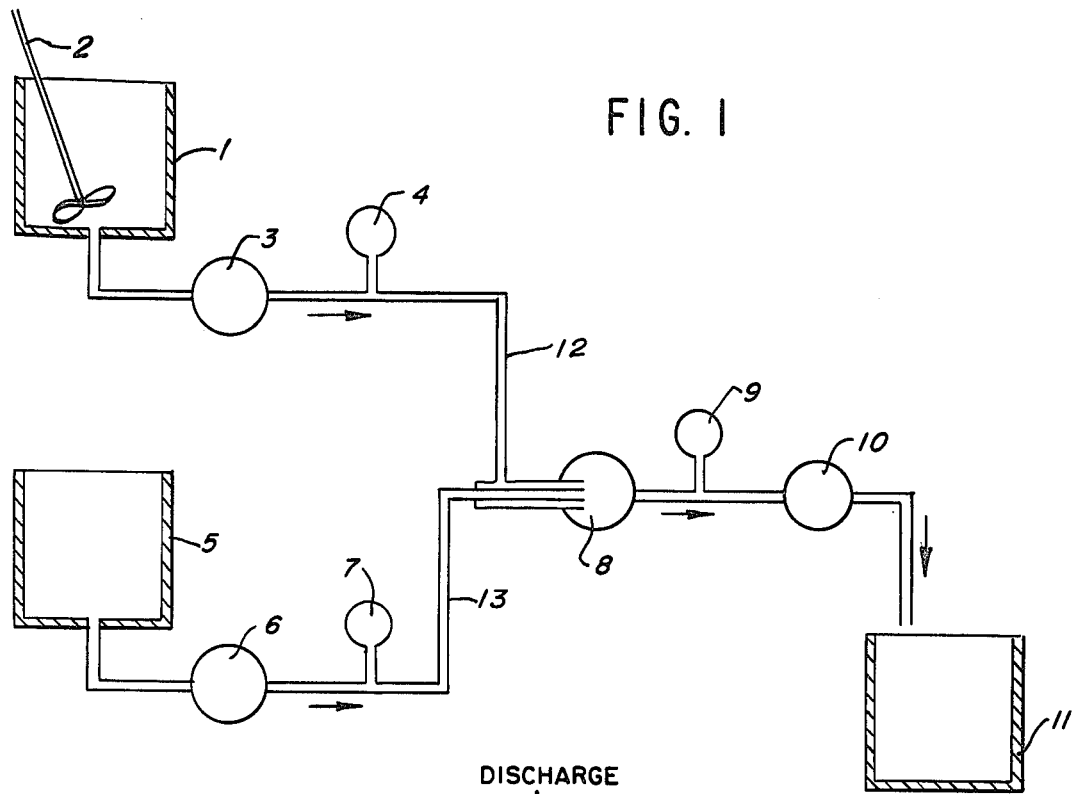
FIG. 1 is a diagrammatic flow chart illustrating a typical embodiment of the process of this invention.

Referring to the drawings, FIG. 1 is a flow diagram illustrating a typical process according to this invention.

Thus, the starch which is to be treated is prepared in an aqueous slurry in the slurry tank 1 with the aid of an agitator 2. Slurry concentration will be determined by the intended application and the desired viscometric properties of the resultant paste. Generally the concentration may range up to about 44% dry solids. A starch solvent solution is stored in the starch solvent storage tank 5. Solution concentration of the starch solvent will be governed by the stability of the solvent solution and the intended application. For example, the preferred range for sodium hydroxide is between 30 and 50% dry solids. The starch slurry and starch solvent solution are simultaneously pumped by means of positive displacement pumps 3 and 6, respectively, through a centrifugal pump 8. A pressure regulating valve 10, or sufficient head on the discharge side of the pump, is employed to maintain the operating pressure or back-pressure greater than the shut-off pressure as defined in the performance curve of the centrifugal pump. The result is a centrifugal pump unit which works as a mechanical shear mixing device but with no pumping capacity. Operating pressure is monitored by way of pressure gauges 4, 7, and 9. The resultant starch paste is collected in a paste receiving tank 11.

Figure 2:
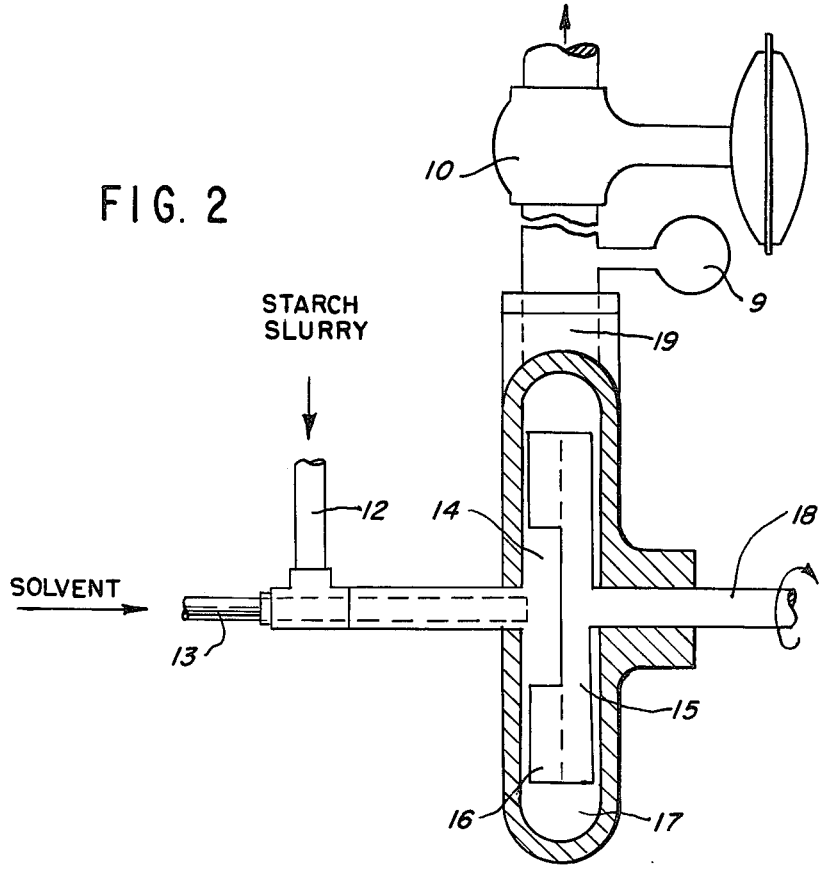
FIG. 2 is an enlarged sectional view of a centrifugal pump which can be used to impart mechanical shear in the process of the invention.

FIG. 2 illustrates the construction of a typical centrifugal pump, with pressure regulating valve, which, when operated with a back-pressure imparts mechanical shear to the starch-solvent mixture. As shown in FIG. 2, the aqueous starch slurry is supplied through an inlet pipe 12 at a known and controlled flow rate into the eye 14 (center) of the impeller 15. Starch solvent flows at a known and controlled flow rate through the pipe 13 also to the impeller eye 14. The impeller 15 is rotated by a motor driven shaft 18. The impeller 15 has radial vanes 16 integrally attached to it. The two liquids flow radially outward in the spaces between the vanes. By the action of the impeller vanes, mixing and back-blending of the fluids along with mechanical shear are accomplished. The velocity of the fluid is increased when contacted by the impeller vanes 16 and the fluid is moved to the periphery where it is collected in the outer edges of the impeller reaction chamber 17. Reacted material then flows toward and out the discharge port 19.

The constant pressure regulating valve 10 maintains a pressure above the shut-off pressure for the centrifugal pump. It then becomes an in-line device directing the rotating shaft mechanical energy into the flow medium. The back pressure allows the impeller reaction chamber and space between the vanes to always remain full to avoid cavitation. The material flow rate is determined only by the input fluid flow rate to the pump. By the process of this invention, a gelatinized, essentially homogeneous starch having a stable viscosity can be obtained continuously and essentially instantaneously.

For the description of the invention herein, a typical centrifugal type of pump was employed to impart mechanical shear in accordance with this invention. Centrifugal pumps, operated against a back-pressure greater than the pump shut-off presssure, are convenient and suitable devices for use in accordance with the invention. Other means for imparting mechanical shear when operated to produce shear as described herein include, for example, dispersers (such as manufactured by Kinetic Dispersion Corporation), homogenizers (such as manufactured by Tekmar Co.), shear pumps (such as manufactured by Waukesha Foundry Co.), emulsifiers (such as manufactured by Nettco Corp.), sonic emulsifiers (such as manufactured by Sonic Corp.), colloid mills (such as manufactured by Gaulin Corp.), high speed wet mills (such as manufactured by Day Mixing), jets (such as manufactured by Penberthy Div., Houdaille Industries, Inc.), high intensity mixers (such as manufactured by J. W. Greer, Inc.) and the like.

The intensity of the shearing force to which the starch-starch solvent mixture is subjected according to the invention varies widely depending upon the ease of gelatinization of the particular starch, the starch concentration, the amount of starch solvent utilized, the temperature at which the process is conducted and other factors known to those skilled in the art. Since the type of starch, the aqueous slurry concentration, temperature, alkali type and level, as well as the mechanical shear device equipment design and efficiency, all contribute to the final product characteristics, the minimum shear required to give a thoroughly dispersed, homogeneous starch paste with a stable viscosity varies widely.

The minimum amount of shearing force required to achieve a starch paste which exhibits the desired characteristics substantially instantaneously after subjecting the mixture of starch and starch solvent to the shearing action can be routinely determined.

Figure 3:
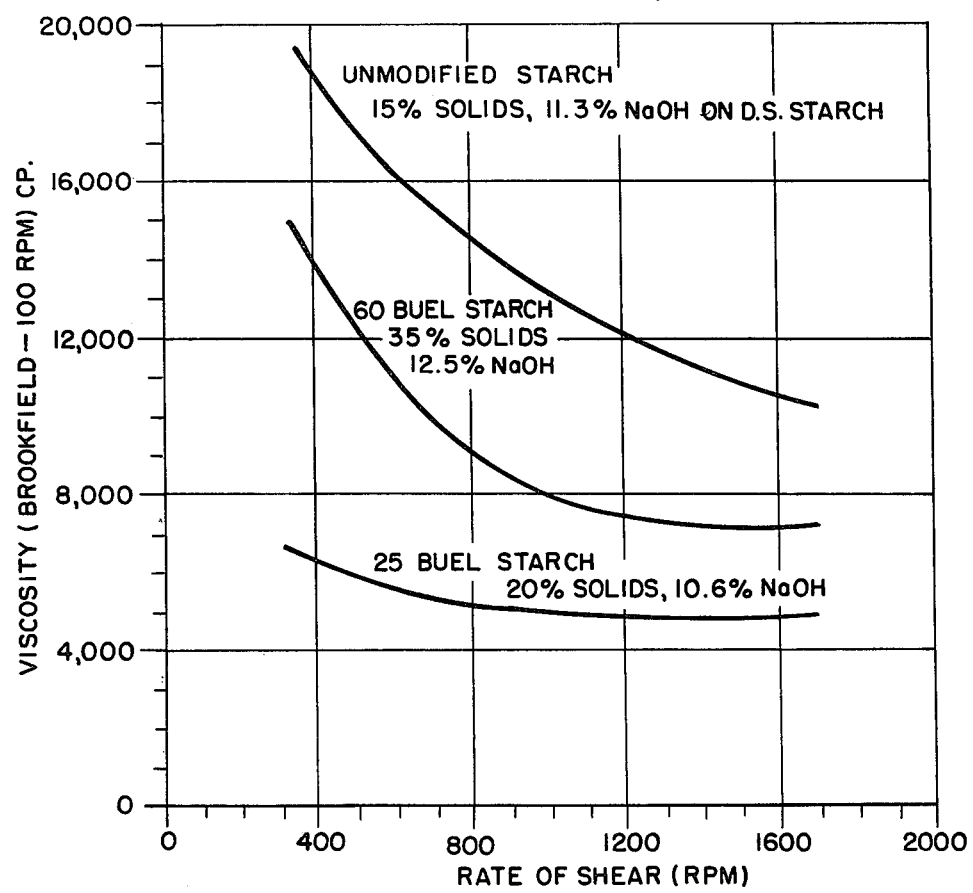
FIG. 3 is a graph illustrating the relationship of mechanical shear input to viscosity for different starch slurry variables.

Thus, FIG. 3 shows the change in viscosity with change in shear input expressed as revolutions per minute for different types of starches and slurry concentrations approaching stability. The data plotted in FIG. 3 was obtained using as the shear imparting device a centrifugal pump as described in Example 1. With a centrifugal pump of this type the rate of shear depends on the diameter and speed of the pump impeller. Since the size of the impeller remained constant, the rate of shear was directly proportional to the speed (R.P.M. or revolutions per minute) of the impeller.

As is readily apparent from the data plotted in FIG. 3, a different shear stress is required to achieve shear stable viscosities with different raw materials and conditions. Thus, as seen from FIG. 3, the shear stable viscosities of the 25-Buel, 60-Buel and unmodified starch under the treatment conditions were, respectively, approximately 5,000, 7,000 and 10,000 centipoise. After selecting the desired starch/solvent combination, one can routinely employ a suitable shear device to obtain viscosity and shear data similar to those plotted in FIG. 3. From such data, the shear input required to obtain a shear stable paste can be readily determined $$\left(\text{i.e., } \frac{\Delta V}{\Delta S} \text{ essentially } 0\right).$$

The preferred range of shear input can thus be easily determined for a particular starch/solvent combination. Experience has shown that as the viscosity of the starch paste approaches the point of maximum shear stability, the paste is essentially homogeneous and substantially completely dispersed, i.e., it is substantially completely gelatinized. This is, of course, desired for optimum functionality of the starch paste. For certain applications, acceptable functionality is achieved when the viscosity of the paste is as high as about twice the shear stable viscosity.

The process of this invention is applicable for rapidly hydrating or gelatinizing starches in general. Thus, it is applicable to cereal grain starches and root starches, such as corn, wheat, potato, tapioca starch and the like.

It is applicable to starches resulting from dry milling such as corn grits, corn meal, corn flour and the like and can be applied to starches which have been modified by previous treatment such as cross-linking or stabilization, acid modification, oxidation, derivatization and the like.

As is known in the art, a variety of starch solvents have been used in starch gelatinization processes and such solvents can be used in practicing this invention. Such solvents are, for example, sodium hydroxide, potassium hydroxide, calcium chloride, lithium hydroxide, dimethyl sulfoxide, dimethyl formamide, pyridine and the like.

The amount of starch solvent required to accomplish gelatinization and dispersion will vary with the specific conditions encountered. Factors affecting solvent demand include (1) the type of starch used (i.e., corn, wheat, potato, etc.), (2) the type of starch pretreatment (i.e., derivatization, oxidation, cross-linking, stabilization, etc.), (3) the starch concentration, (4) the viscosity of the resultant paste as affected by depolymerization, (5) temperature, and (6) the solvent used. Preferred solvents are sodium hydroxide and potassium hydroxide. The preferred range of solvent used is about 8 to 18% titratable alkalinity when expressed as percent sodium hydroxide on dry substance starch basis; the solvent, however, can be used in amounts from about 6 to 30% titratable alkalinity. As is known, higher starch concentrations or highly modified starches generally require less starch solvent for pasting.

The following examples illustrate the invention and the advantages thereof.

EXAMPLE 1

An aqueous slurry was prepared, containing unmodified corn starch at 12% dry solids (d.s.) and pumped using a positive displacement Moyno pump at a constant flow rate of 0.5 gallon per minute (GPM) to the eye of a centrifugal pump. The centrifugal pump used was a Worthington Model ⅜ CNG-4 with a standard full size impeller. The impeller was a 3⅝ inch diameter open impeller with two straight vanes of approximately 7/16 inch width. The vanes extended for a distance of 1⅜ inch inward from the outer tip, and were pitched backwards from the rotation at an angle of approximately 47° from the point of intersection of a radius and the inner edge of the vane.

Simultaneously a solution of sodium hydroxide (30% d.s.) was pumped into the centrifugal pump. The amount of sodium hydroxide utilized was controlled by an appropriate increase or decrease in its flow rate. All flow rates were measured on actual equipment by volume/time measurements.

Back-pressure was maintained on the system at approximately 72 PSIG by means of a pressure regulating valve.

The aqueous starch slurry and the starch solvent (sodium hydroxide) were mixed and the starch gelatinized and dispersed by aid of the mechanical shear of the centrifugal pump, which was operated at a constant speed of 3600 rpm. Pump volume was such that the average residence time was approximately 2.4 to 2.9 seconds in the reaction chamber.

Samples of the starch paste leaving the centrifugal pump were collected and tested initially, i.e., substantially immediately after collection, for titratable alkalinity and initial viscosity. The viscosity of the sample was also tested 24 hours later. A sample (#5 in Table I) of the starch slurry was also cooked by a more conventional process, i.e., heating to 210° F., with the use of no alkali and held for ten minutes with agitation in a batch tank. The results are summarized in Table I.

TABLE I

| Sample Number | Titratable Alkalinity* | Brookfield Viscosity (Centipoise) at 76° F. | |
|---|---|---|---|
| | | Initially | After 24 Hours |
| 1 | 9.5% | 7,930 | 15,160 |
| 2 | 11.4% | 9,600 | 8,170 |
| 3 | 14.4% | 4,920 | 4,200 |
| 4 | 16.4% | 4,940 | 3,430 |
| 5 | None | 7,200** | Rigid Gel |

*Titratable alkalinity expressed as % NaOH on dry substance starch basis.
**Viscosity at 180° F.

A microscopic examination showed that at the 9.5% level of sodium hydroxide on dry substance starch basis the starch granules were swollen but not completely dispersed, whereas at the 14% sodium hydroxide (Sample 3) level the paste was homogeneous, well dispersed and the paste viscosity after 24 hours was substantially the same as it was initially.

The starch pastes of samples 2, 3 and 4, after being subjected to the mechanical shearing, were viscosity stable from the standpoint of shear stability and storage stability.

The conventionally cooked starch (Sample 5) formed a rigid gel on holding at room temperature.

EXAMPLE 2

Following the procedure used in Example 1, a similar corn starch at a solids level of approximately 15% dry substance (d.s.) was processed except that during part of the operation the centrifugal pump was turned off so that no mechanical shear was imparted to the starch paste.

TABLE II

| Sample Number | Titratable Alkalinity | Shear | Brookfield Viscosity (Centipoise) | |
|---|---|---|---|---|
| | | | Initially | After 24 Hours |
| 1 | 19.0% | Yes | 5,680 | 6,060 |
| 2 | 19.0% | No | 56,000 | 10,900 |

The effect of mechanical shear on the viscosity of the paste is evident. Although a very high level of sodium hydroxide was used, in contrast to Sample 1, Sample 2, which had not been subjected to shear, did not have a stable viscosity (shear stability) after exiting from the centrifugal pump nor was it storage stable.

EXAMPLE 3

Using the procedure of Example 1, an unmodified corn starch slurry was treated at a level of 12% dry solids using varying levels of sodium hydroxide. The samples were tested for titratable alkalinity, viscosity, and examined microscopically with the following results:

TABLE III

| Conversion Number | Titratable Alkalinity | Brookfield Viscosity (Centipoise) | | Microscopic Examination |
|---|---|---|---|---|
| | | Initially | After 24 Hours at Room Temperature | |
| 1 | 9.8% | 8,290 | Rigid Gel | Large ballooned |

TABLE III-continued

| | | Brookfield Viscosity (Centipoise) | | |
|---|---|---|---|---|
| Conversion Number | Titratable Alkalinity | Initially | After 24 Hours at Room Temperature | Microscopic Examination |
| 2 | 12.8% | 7,520 | 5,710 | starch granules No granular structure, starch was well dispersed |

Sample #1, when held 24 hours at room temperature, set up to a rigid gel. Microscopic examination showed Sample #1 was not thoroughly dispersed. Microscopic examination of Sample 190 2 at the higher caustic level revealed a product that was thoroughly dispersed and the viscosity data indicated the product to be stable from the standpoint of shear stability and storage stability.

EXAMPLE 4

A starch slurry was prepared at 40% dry solids using acid modified starch having an alkali fluidity of approximately 60 Buel and treated using various alkali levels as in Example 1. The results obtained are summarized below:

| Sample Number | Titratable Alkalinity | Brookfield Viscosity (Centipoise) | |
|---|---|---|---|
| | | Initial | After 24 Hours |
| 1 | 6.95% | Too viscous to test | Too viscous to test |
| 2 | 9.4% | 19,080 | Too viscous to test |
| 3 | 10.7% | 14,920 | Too viscous to test |
| 4 | 12.5% | 21,840 | 17,960 |

This example illustrates that starch slurries of high solids levels can be treated in accordance with this invention.

An attempt was made to thermally convert a slurry sample of the same starch at a level of 35% dry solids by heating the slurry to 210° F. and holding under agitation for ten minutes in a batch tank without use of alkali. The resultant paste was too viscous to test at 180° F. as compared to the above samples (2-4) which were tested at room temperature. The initial viscosities of the above starch pastes at 40% dry solids level illustrate the improved viscosity and handling properties of the product from the chemical-mechanical converting process of this invention.

EXAMPLE 5

A starch slurry was prepared using acid modified starch of approximately 25 Buel fluidity at a level of 30% dry solids and treated with alkali as in Example 1. Analysis of the shear stable paste was as follows:

| Titratable Alkalinity | Brookfield Viscosity (Centipoise) | |
|---|---|---|
| | Initial | After 24 Hours |
| 10.5% | 8,660 | 20,560 |

Although the viscosity data demonstrate that the product did not possess good storage stability (because of low amount of alkali used), it did possess good functional qualities.

A film was prepared by casting the starch paste on glass with a thin layer chromatography applicator. The film was clear, pliable and quite strong. A sample of the film was cut and tested for tensile strength with the following results:

| Film width - | 1 inch |
|---|---|
| Film thickness - | 0.0043 inch |
| Film strength - | 27.5# |
| | = 6,395#/in.$^2$ |

EXAMPLE 6

A starch slurry was prepared using acid modified starch (25 Buel fluidity) at 25% dry solids. The slurry was treated as described with respect to Example 1. The resultant shear stable paste was tested for alkalinity and viscosity as follows:

| Titratable Alkalinity | Initial Brookfield Viscosity (Centipoise) |
|---|---|
| 10.1% | 2,876 |

To test paste quality as a corrugating adhesive, samples of corrugated board were prepared by casting a film of paste 0.5 mils thick on a polypropylene sheet. Flute tips of single face board were carefully dipped into the film thereby applying adhesive to the tips, then the single face board was applied to double back liner. To one sample of paste was added approximately 10% of Parez 613 resin for waterproofing properties. The samples were treated differently as shown in the following table to affect resin curing and finally the board samples were tested for waterproof properties by soaking in soft water. The data are summarized in the following table:

| Sample Number | Parez 613 Added | Sample Treatment | Water Soak Test |
|---|---|---|---|
| 1 | None | Air drying | Voluntary delamination in 15 minutes |
| 2 | 10% | Air drying | Voluntary delamination in 15 minutes |
| 3 | 10% | 10 seconds at 300° F. | Voluntary delamination in 60 minutes |
| 4 | 10% | 10 minutes at 205° F. | Fiber pull after 30 hours |

The above results illustrate that the resultant starch paste can be used advantageously with resinous material as a corrugating adhesive and produces a water resistant or waterproof bond.

EXAMPLE 7

Starch slurries were prepared using starches of various types and corn starches with various types of pretreatments. The starches were then treated as described with respect to Example 1 except Samples 1 through 6 were run with the centrifugal pump operating at 1600 RPM.

Data with respect to eight samples are tabulated below:

EXAMPLE 9

| Sample Number | RPM | Type of Starch | Starch Pretreatment | Starch Concentration | Titratable Alkalinity | Initial Brookfield Viscosity (Centipoise) at 100 RPM |
| --- | --- | --- | --- | --- | --- | --- |
| 1 | 1,600 | Corn | Acid modified 60 Buel fluidity | 30% | 11.5% | 3,320 |
| 2 | 1,600 | Corn | Urea formaldehyde cross-linked | 10% | 16.2% | 14,340* |
| 3 | 1,600 | Corn | Hydroxyethyl ether 80 Buel | 25% | 11.7% | 684 |
| 4 | 1,600 | Corn | Oxidized Starch 0.55% carboxyl | 30% | 11.9% | 572 |
| 5 | 1,600 | Tapioca | None | 12% | 12.7% | 8,700 |
| 6 | 1,600 | Wheat | None | 12% | 14.4% | 17,120 |
| 7 | 3,600 | Waxy Maize | None | 12% | 16.2% | 9,160 |
| 8 | 3,600 | High Amylose | None | 12% | 15.2% | 5,060 |

*Brookfield Viscosity at 50 RPM

EXAMPLE 8

Slurries were prepared at 12% dry solids using unmodified corn starch and water at two temperatures, 60° F. and 130° F., respectively, resulting in slurries being at 68° F. and 120° F., respectively. Each slurry was treated as described in Example 1, except the centrifugal pump was operated at 1600 RPM, with varying levels of sodium hydroxide. The resultant paste samples were tested for titratable alkalinity and initial viscosity and then divided into four samples for storage at room temperature (RT), 120° F., 150° F. and 180° F., respectively. After 24 hours, the samples were all adjusted to RT and tested for Brookfield viscosity. The results of those tests were:

| Titratable Alkalinity | Slurry Temp. °F. | Brookfield Viscosity (Centipoise) | | | | |
| --- | --- | --- | --- | --- | --- | --- |
| | | Initial* | after 24 Hours | | | |
| | | | R.T. | 120° F. | 150° F. | 180° F. |
| 8.7% | 68 | 21,040 | >40,000 | 29,880 | 23,560 | 20,320 |
| 8.7% | 120 | 6,440 | 38,120 | 17,640 | 13,680 | 9,430 |
| 10.3% | 68 | 19,760 | 36,280 | 19,840 | 17,300 | 12,760 |
| 10.3% | 120 | 3,990 | 19,360 | 6,340 | 6,220 | 7,310 |
| 11.8% | 68 | 15,760 | 15,200 | 10,000 | 8,720 | 8,200 |
| 12.3% | 120 | 2,880 | 4,380 | 3,600 | 2,930 | 1,976 |
| 13.8% | 68 | 8,280 | 7,640 | 7,380 | 7,160 | 4,750 |
| 14.0% | 120 | 2,312 | 3,130 | 3,060 | 2,536 | 1,265 |
| 15.6% | 68 | 6,780 | 4,670 | 4,880 | 3,450 | 2,476 |
| 15.8% | 120 | 1,912 | 2,784 | 2,628 | 2,264 | 1,376 |

*Tested without temperature adjustment and substantially immediately after exiting from the centrifugal pump.

Data contained in the above table illustrate primarily three factors:

1. Higher conversion temperatures result in lower viscosities which indicates the additive pasting effect of chemical (solvent), mechanical (shear force), and thermal (temperature) energy.
2. For storage stability higher solvent levels are required.
3. Elevated storage temperatures demonstrate two effects on paste properties.
   a. As would be expected, storage stabilities are improved even with lower solvent levels.
   b. At higher solvent levels additional viscosity reduction is observed with the effect being more dramatic as the temperature is increased from 150° to 180° F.

Starch is a beneficial additive in the flotation process for recovery and purification of bone phosphates. To this end, a starch paste was prepared at a 30% dry solids level with 11.5% titratable alkalinity using the procedure described with respect to Example 1. The paste sample was then stored at room temperature for evaluation in phosphate flotation.

For the purpose of comparison, a starch paste was prepared by more conventional means, i.e., cook at low concentration (about 2%) to 210° F. with agitation, add 1% sodium hydroxide and store at room temperature.

Amine circuit flotations were conducted on phosphate samples using 1, a control, i.e., no starch; 2 a conventionally prepared starch paste; and 3, alkaline prepared starch paste prepared in accordance with this invention. Samples were tested for product (concentration) yield and percent insolubles in product and tailings. The results are as follows:

| Sample Number | Starch Used | lbs. Starch per ton ore | Product Yield % | % Insol in prod. | % Insol in tailings | % Increase Yield |
| --- | --- | --- | --- | --- | --- | --- |
| 1 | None | 0 | 58.2 | 3.6 | 88.0 | — |
| 2 | Conventionally Prepared | 0.24 | 60.6 | 8.3 | 96.3 | 4.3 |
| 3 | Alkaline Prepared | 0.23 | 61.9 | 4.8 | 93.2 | 6.5 |

The results illustrate that the starch paste prepared in accordance with the invention involving chemical and mechanical hydration is functional. As compared with the conventionally prepared starch paste, the starch prepared in accordance with this invention improved the product yield in beneficiation of phosphate ores.

The ability to prepare starch pastes substantially instantaneously at high solids without the use of heat is of particular significance for most mining applications because (1) steam is not usually available at ore beneficiation sites; (2) starch is difficult to process with heat sources such as gas or electricity (this is particularly so at high solids); (3) storage of conventionally prepared starch paste is very difficult even at low solids; and (4) the ability to convert at high solids levels reduces capital outlay for processing and storage tanks.

EXAMPLE 10

A starch adhesive was prepared by treating an acid modified starch (25 Buel fluidity) at 20% dry solids with 13% sodium hydroxide, as described in Example 1. The prepared adhesive had a Brookfield viscosity of 3,700 CPS at 100 RPM. This adhesive was used to combine single face board with double back liner on a conventional paperboard corrugator operating with a cool (120°-150° F.) hot plate section.

The combined board was allowed to condition prior to testing. Upon testing, the bond exhibited a ply adhesion value of 91.6 pounds.

EXAMPLE 11

A starch adhesive was prepared by treating an acid modified corn starch (60 Buel fluidity) at 25% dry solids with 14% sodium hydroxide as described in Example 1. The adhesive had a Brookfield viscosity of 2100 cps at 100 RPM.

This adhesive was used to combine fluted medium and liner under reduced (less than 160° F.) operating temperature on a conventional single face paperboard corrugator. The single face board handled well on the bridge and exhibited good ply adhesion after conditioning.

EXAMPLE 12

A starch slurry was prepared using unmodified corn starch at a 12% dry solids level. The starch was pumped at a controlled flow rate to a static mixer which was a Kenics Static Mixer consisting of a series of fixed helical elements enclosed within a tubular housing. Simultaneously, a sodium hydroxide solution (30% conc.) was added to give one fixed concentration based on the dry solids level of starch. To obtain uniform flow and assist mixing, it was necessary to control back pressure on the unit at approximately 90 psig. Product obtained from the unit was not well dispersed and was non-uniform. The sample was tested for titratable alkalinity and viscosity. For the purpose of comparison, data for a sample of the same starch treated as described in Example 1 using mechanical shear are summarized.

| Sample Number | Mixing Unit | Titratable Alkalinity | Brookfield Viscosity (Centipoise) at 100 RPM | |
|---|---|---|---|---|
| | | | Initial | 24 Hr. Viscosity |
| 1 | Static Mixer | 16.6% | 24,240 | 24,360 |
| 2 | Mechanical Shear | 16.8% | 3,260 | 2,800 |

The data illustrate that mere intimate mixing of alkali and starch as in the Static Mixer does not produce a product similar to that produced by the process described herein.

EXAMPLE 13

A starch slurry was prepared at a 20% dry solids level using an acid modified starch of approximately 25 Buel fluidity and treated as described in Example 1 except 40% potassium hydroxide solution was used as the starch solvent.

Samples were tested for titratable alkalinity and viscosity with the following results:

| Sample Number | Titratable Alkalinity* | % KOH on d.s. starch | Brookfield Viscosity (Centipoise) at 100 RPM | |
|---|---|---|---|---|
| | | | Initial | After 24 Hours |
| 1 | 9.4% | 13.2 | 13,240 | 11,840 |
| 2 | 12.5% | 17.5 | 3,960 | 2,920 |
| 3 | 14% | 19.6 | 2,564 | 2,200 |
| 4 | 15.6% | 21.8 | 2,156 | 2,044 |
| 5 | 17% | 23.8 | 1,924 | 2,060 |
| 6 | 18.5% | 25.9 | 1,840 | 2,000 |

*Expressed as NaOH

EXAMPLE 14

An aqueous slurry was prepared using an acid modified starch of approximately 25 Buel fluidity at 20% d.s. The starch slurry was converted as described in Example 1.

The resultant paste was tested and a quart sample was frozen for 24 hours to determine freeze-thaw characteristics. The sample was examined visually when removed from the freezer, allowed to equilibrate to room temperature, examined again, and the viscosity determined. The sample was uniform and no indication of syneresis was detected. The results of testing are as follows:

| | Brookfield Viscosity (Centipoise) at 100 RPM | |
|---|---|---|
| Titratable Alkalinity | Initial | After 24 Hours |
| 12.85% | 2,648 | 3,028 |

The above results illustrate that the product has good freeze-thaw stability.

EXAMPLE 15

An aqueous slurry was prepared using an acid modified starch of approximately 60 Buel fluidity at 35% dry solids concentration. Sodium hydroxide was added to the slurry at a rate to provide approximately 12.5% sodium hydroxide based on starch dry substance basis. The slurry was treated as described in Example 1 with the centrifugal pump being operated at different revolutions per minute. The following data were obtained on the pastes produced:

| Paste | Pump Speed (RPM) | Initial Brookfield Viscosity (Centipoise) |
|---|---|---|
| A | 370 | 13,920 |
| B | 600 | 11,680 |
| C | 1010 | 7,700 |
| D | 1350 | 7,180 |
| E | 1590 | 7,140 |

Paste A, which exhibited a viscosity of approximately 1.95 that of Paste E which was shear stable, was sufficiently pasted or gelatinized and dispersed to adapt it for use in applications which utilize relatively viscous pastes.

EXAMPLE 16

An aqueous slurry was prepared using unmodified starch at 15% dry solids concentration. Sodium hydroxide was added to the slurry at a rate to provide approximately 9.2% sodium hydroxide based on starch dry substance basis. The slurry was treated as described in Example 1 with the centrifugal pump being operated at different revolutions per minute. The following data were obtained on the pastes produced:

| Paste | Pump Speed (RPM) | Initial Brookfield Viscosity (Centipoise) |
|---|---|---|
| F | 370 | 19,280 |
| G | 600 | 14,400 |
| H | 1010 | 16,200 |
| I | 1350 | 11,320 |
| J | 1600 | 10,600 |

Paste F, which exhibited a viscosity of approximately 1.82 that of Paste J which was shear stable, was sufficiently pasted or gelatinized and dispersed to adapt it for use in applications which utilize relatively viscous pastes.

The advantages of the invention are significant. By the process of the present invention starch can be hydrated or gelatinized at sites where sources of heat such as steam are not available. The starch can be hydrated in a continuous manner very quickly without the need of large capacity mixers as would be required in batch-type gelatinization processes. The product obtained by the process is a fully dispersed, homogeneous, gelatinized starch having very good adhesive, film forming and freeze-thaw properties. By practice of this invention one can prepare shear stable and/or storage stable pastes which are suitable for many different end uses.

Those modifications and equivalents which fall within the spirit of the invention are to be considered a part thereof.

What is claimed is:

1. A process for gelatinizing and dispersing starch which comprises bringing together an aqueous slurry of starch and a starch solvent and without the application of external heat imparting thereto a shearing force at a temperature below 100° C., the shearing force being sufficient to provide in less than 5 minutes a gelatinized, dispersed, essentially homogeneous starch paste having a viscosity ranging from about 1.0 to about 2.0 times the shear stable viscosity of the paste, and then removing from the action of the shearing force said starch paste.

2. A process according to claim 1 wherein the starch solvent is sodium hydroxide.

3. A proccess according to claim 1 wherein the starch solvent is potassium hydroxide.

4. A process according to claim 1 wherein a starch solvent is introduced into an aqueous starch slurry in continuous manner and the starch slurry-starch solvent mixture is subjected to said shearing force to provide a gelatinized, dispersed, essentially homogeneous starch paste and the said starch paste is recovered in continuous manner.

* * * * *